July 28, 1953 L. T. DAIGLE 2,646,872
TROLLEY CONVEYER

Filed Nov. 21, 1951 2 Sheets-Sheet 1

INVENTOR.
LEO T. DAIGLE.
BY
Robert A. Sloman
ATTORNEY.

July 28, 1953 L. T. DAIGLE 2,646,872
TROLLEY CONVEYER
Filed Nov. 21, 1951 2 Sheets-Sheet 2
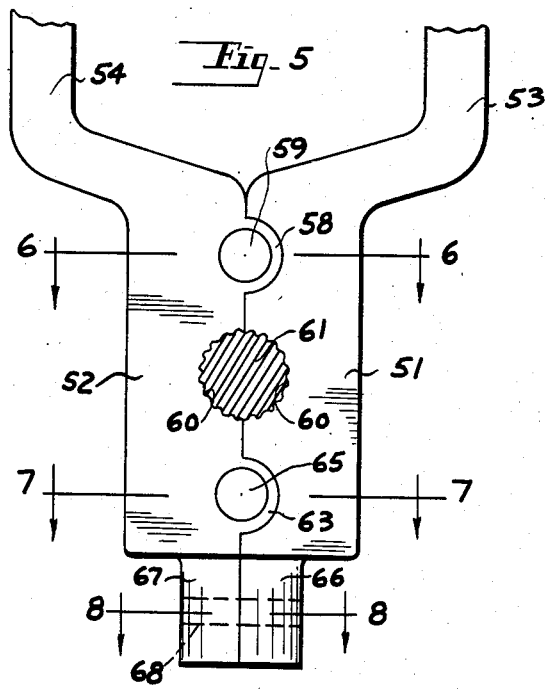
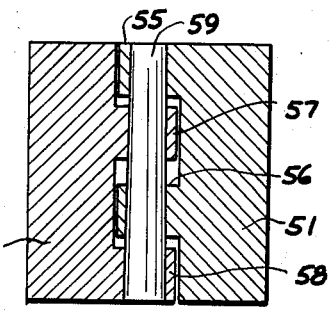
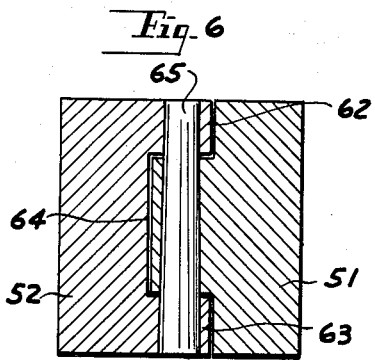
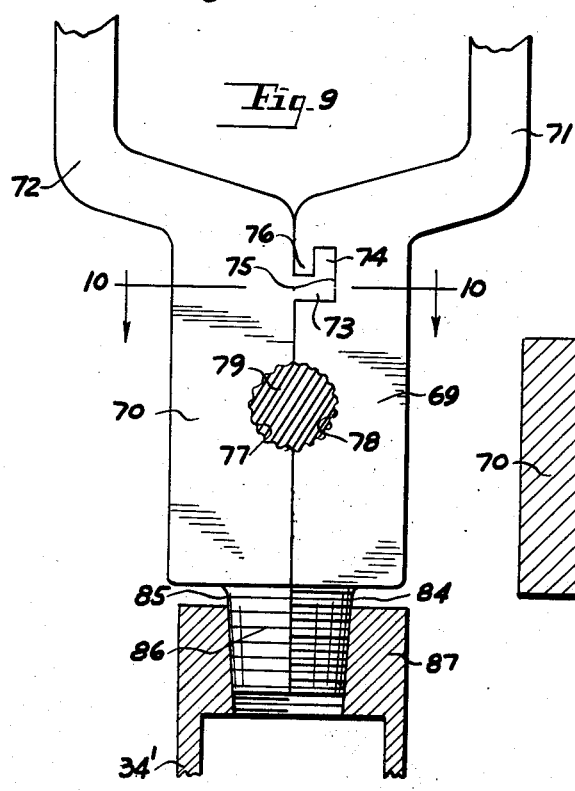
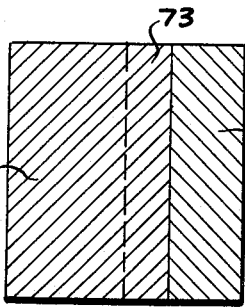
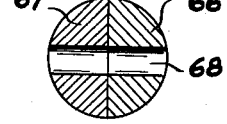
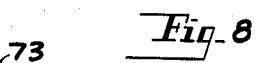
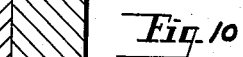
INVENTOR.
LEO T. DAIGLE
BY
Robert A. Sloman
ATTORNEY.

Patented July 28, 1953

2,646,872

UNITED STATES PATENT OFFICE 2,646,872

TROLLEY CONVEYER

Leo T. Daigle, Detroit, Mich., assignor to Cable-Link Corporation, Detroit, Mich., a corporation of Michigan Application November 21, 1951, Serial No. 257,605

14 Claims. (Cl. 198—177)

1

This invention relates to a trolley device for transporting a load along an overhead rail by means of a cable. More particularly, this invention relates to a trolley mechanism having wheels which are supported to bear upon the lower flange of an I beam together with the load supporting structure which depends from said wheels and which is adapted to be removably joined to a cable.

It is the object of the present invention to provide a simplified trolley conveyor which is inexpensive to manufacture and which may be easily and removably secured to a cable throughout any portion of its length.

This and other objects will be seen from the following specification and claims in conjunction with the appended drawings in which:

Fig. 5 is a fragmentary end elevational view of a slightly different form of trolley construction.

Fig. 6 is a section taken on line 6—6 of Fig. 5.

Fig. 7 is a section taken on line 7—7 of Fig. 5.

Fig. 8 is a section taken on line 8—8 of Fig. 5.

Fig. 9 is a fragmentary end elevational view of another variation of trolley construction, with a portion thereof sectioned for illustration.

Fig. 10 is a section taken on line 10—10 of Fig. 9.

Figure 1:
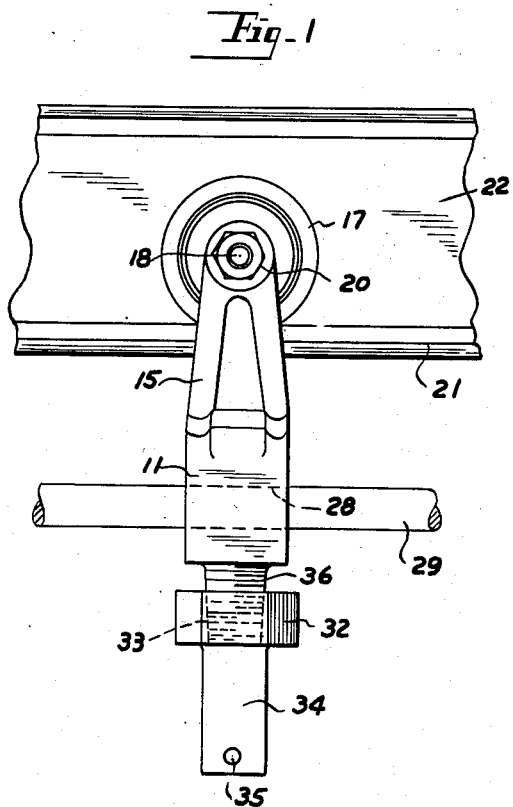
Fig. 1 is a side elevational view of the trolley conveyor mounting upon a flanged beam.

It will be understood that the above drawings illustrate merely preferred embodiments of the invention and other embodiments are contemplated within the scope of the claims hereafter set forth.

Referring to the drawings Figs. 1, 2, 3 and 4, the trolley conveyor consists of a pair of similarly shaped oppositely arranged upright cable clamps 11 and 12, formed at their upper ends with outwardly and angularly upwardly inclined extensions 13 and 14 respectively.

Said extensions terminate at their upper ends in the oppositely arranged spaced arms 15 and

2

16 respectively, which support the tapered rollers 17.

Said rollers are spaced from each other and are journaled upon the stud shafts 18 which are longitudinally aligned and which project at right angles from the upper ends of the arms 15 and 16. Said stud shafts have washers 19 thereon upon one side of said arms, and are secured upon said arms by the nuts 20.

The rollers 17 bear upon the lower inclined flanges 21 of the horizontally arranged I beam 22, which is fragmentarily shown in Fig. 1 and which is supported in any suitable fashion.

Figure 4:
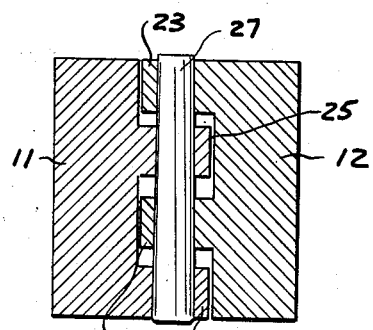
Fig. 4 is a section taken on line 4—4 of Fig. 2.

The cable clamps 11 and 12 are hingedly interconnected by the tapered pin 27 as shown in detail in Fig. 4. Clamp 11 has formed upon its inner surface a pair of transversely arranged spaced hinge elements 23 and 24 whose tapered openings are adapted for alignment with a corresponding pair of inwardly directed transversely arranged hinge elements 25 and 26 which form a part of the clamp 12.

Each of the clamps 11 and 12 have formed within their interior surfaces transverse slots which are semi-circular in cross-section and whose interior surfaces have formed therein the irregularities 28 for cooperative retaining engagement with the cable 29. Said cable 29 adapted for longitudinal movement by any convenient mechanism, is so arranged below the beam 22 that clamps 11 and 12 will fit thereover with their corresponding transverse recesses fitting over cable 29 in the manner illustrated in Fig. 2.

Clamps 11 and 12 below their transverse cable receiving recesses have depending cooperating extensions 30 and 31 which are each semi-circular in cross-section, and which are threaded at 36 to form when assembled a tapered stud of decreasing diameter.

The nut 32 having an interior correspondingly tapered thread 33 is adapted to threadably engage the threaded portions 30 and 31 for securing the clamps 11 and 12 together and to the cable 29.

Figure 2:
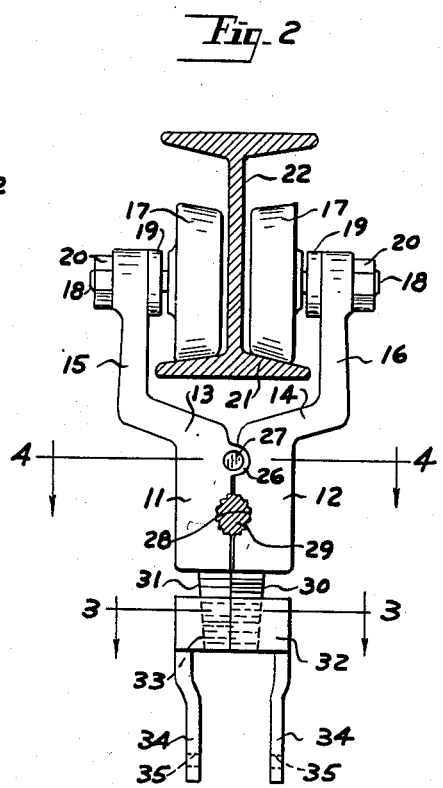
Fig. 2 is an end elevational view thereof.

As shown in Fig. 2 the nut 32 has a pair of depending spaced arms 34 with transverse openings 35 at their lower ends providing a means of supporting a load thereon.

Figure 11:
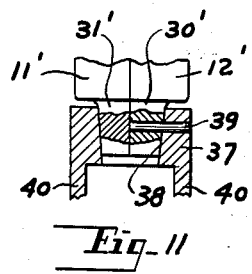
Fig. 11 is a fragmentary elevational section illustrating a slightly different form of securing the tapered sleeve to the corresponding tapered portions of the trolley device shown in Fig. 2.
Figure 3:
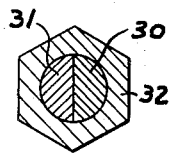
Fig. 3 is a section taken on line 3—3 of Fig. 2.

Fig. 11 shows a slightly different method of securing the tapered portions 30' and 31' which correspond to the elements 30 and 31 of Fig. 2, and which form parts of the clamps 11' and 12' respectively which are fragmentarily illustrated. In this case the elements 30' and 31' are tapered with a decreasing diameter towards their lower ends and are adapted to cooperatively receive thereover the circular sleeve 37 which has a corresponding tapered interior 38, which when assembled secures the clamps 11' and 12' together. Transverse pin 39 extends through a portion of the sleeve 37 and through a corresponding opening in one of the clamp depending elements, such as element 30', for immovably securing sleeve 37 upon depending elements 30' and 31'.

Here also the sleeve 37 has a pair of depending load supporting elements 40 which are fragmentarily shown and which are constructed the same as the corresponding elements 34 shown in Figs. 1 and 2.

Figures 12, 13:
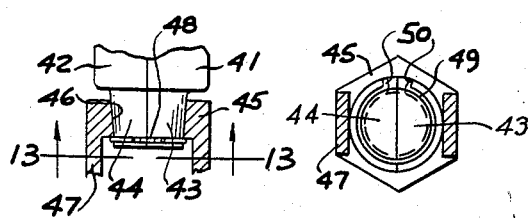
Fig. 12 is fragmentary elevational section similar to Fig. 11 and illustrating still another method of securing the tapered sleeve.
Fig. 13 is a section taken on line 13—13 of Fig. 12.

A slightly different form of securing the clamps together is shown in Fig. 12 wherein the corresponding clamps 41 and 42 have at their lower ends depending tapered portions 43 and 44 which are each semi-circular in cross-section. The locking sleeve 45 having a corresponding interior tapered surface 46 is cooperatively positioned over the registering depending portions 43 and 44 of the clamps 41 and 42 as shown in Fig. 12.

As illustrated in Figs. 12 and 13 the lower portions of the members 43 and 44 have formed therein an annular recess 48 within which is retainingly positioned the circular split locking clip 49 which projects sufficiently beyond the periphery of the tapered elements 43 and 44 as to retain the tapered sleeve 45 in position. The ends of the locking clip 49 are formed radially outward as at 50, providing a means of expanding said locking clip to facilitate its mounting within the recess 48. The sleeve 45 also has a pair of parallel spaced depending load supporting elements 47 which correspond to the similar elements 34 shown in Figs. 1 and 2.

A different form of trolley construction is shown in Fig. 5 which includes the opposed cable clamps 51 and 52 having at their upper ends the outwardly arranged upright roller mounting arms 53 and 54 which correspond to the arms 15 and 16 shown in Fig. 2 of the drawing. The clamp 51 is hingedly connected at its upper portion to clamp 52 by the tapered pin 59 in the same manner above described with respect to Fig. 2. Clamp 51 has a pair of apertured transversely arranged hinge elements 55 and 56 which cooperate with the corresponding inwardly directed hinge elements 57 and 58 which project inwardly from clamp 52. Said hinge elements receive the tapered pin 59 in the manner illustrated in Fig. 6.

Clamps 51 and 52 have corresponding transversely arranged interior slots which are semi-circular in cross-section and which are formed with surface irregularities 60 for cooperative engagement with cable 61.

The lower ends of said clamps are joined together by a second tapered pin 65 which extends through the inwardly directed transversely arranged hinge elements 62 and 63 on clamp 52. Said pin 65 also extends through the apertured inwardly directed transversely intermediate hinge element 64, as shown in Fig. 7.

The clamps 51 and 52 have opposed corresponding depending half-circular portions 66 and 67 as illustrated in Figs. 5 and 8 and which are provided with registering transverse slots 68 by which a load may be supported from the depending load supporting elements 66 and 67. Another variation of trolley construction is shown in Fig. 9 and includes the upright opposed cable clamps 69 and 70. Said clamps have upright outwardly spaced roller mounting arms 71 and 72, which are fragmentarily illustrated in Fig. 9, but which are adapted to carry rollers in the same manner as illustrated in Fig. 2 of the drawing.

The clamps 69 and 70 have corresponding interlocking portions which cooperate for maintaining the clamps in juxtaposition.

Said interlocking portions include the lateral projection 73 on clamp 70 which has upwardly arranged flange 74 which is adapted to be received within the slot 75 formed in the corresponding cable clamp 69. Said slot 75 is partially bounded upon its outer portion by the downwardly depending cooperating flange 76.

By this construction the clamps 69 and 70 are interlocked with respect to each other. Clamps 69 and 70 similarly have opposed interior transverse recesses which are semi-circular in cross-section and which have irregularities 77 and 78 formed upon their interior surfaces for cooperative gripping action with respect to the cable 79 which extends through said opposed recesses.

The lower depending tapered portions 84 and 85 of the clamps 69 and 70 are adapted for cooperative registry with each other to form the downwardly tapered stud which is threaded at 86 and which is adapted to receive the correspondingly tapered interiorly threaded nut 87.

Said nut also has a pair of upright parallel spaced load supporting elements 34' above described with respect to Figs. 1 and 2.

Having described my invention, reference should now be had to the claims which follow for determining the scope thereof.

I claim:

1. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed threaded extensions depending from the lower ends of said clamps below said cable constituting complemental portions of a lug, and a nut threaded upon said lug for interconnecting said clamps in gripping relation to said cable.

2. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed threaded extensions depending from the lower ends of said clamps below said cable constituting complemental portions of a lug, a nut threaded upon said lug for interconnecting said clamps in gripping relation to said cable, and load supporting means depending from said nut.

3. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed tapered threaded extensions depending from the lower ends of said clamps below said cable constituting complemental portions of a lug, and an interiorly tapered nut threaded upon said lug for interconnecting said clamps in gripping relation to said cable.

4. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed tapered threaded extensions depending from the lower ends of said clamps below said cable constituting complemental portions of a lug, and an interiorly tapered nut threaded upon said lug for interconnecting said clamps in gripping relation to said cable, said slotted portions having irregularities upon their interior bounding surfaces to frictionally engage said cable.

5. A trolley for supporting a load along a flanged beam comprising a pair of upright cable clamps having opposed transversely arranged slotted portions to retainingly receive a longitudinally movable cable, means hingedly connecting upper portions of said clamps above said cable, opposed threaded extensions depending from the lower ends of said clamps below said cable constituting complemental portions of a lug, and a nut threaded upon said lug for interconnecting said clamps in gripping relation to said cable.

6. In a trolley for transporting a load, a pair of upright oppositely arranged arms, each of said arms having intermediate its ends oppositely arranged registering clamps with transverse opposed slots formed in their registering surfaces to cooperatively receive a portion of a longitudinally movable cable, means hingedly interconnecting said clamps above said cable, depending one-half circular tapered threaded extensions at the lower ends of said clamps constituting complemental portions of a lug, and an interiorly threaded nut threaded upon said lug.

7. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed tapered extensions depending from the lower ends of said clamps below said cable constituting complemental portions of a lug, an interiorly tapered sleeve positioned over said lug, and locking means interconnecting said lug and sleeve for immovably retaining the latter upon said lug.

8. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed tapered extensions depending from the lower ends of said clamps below said cable constituting complemental portions of a lug, an interiorly tapered sleeve positioned over said lug, and a locking pin transversely extending through corresponding openings in said sleeve and lug.

9. A trolley for supporting a load along a flanged beam comprising a pair of upright cable clamps having opposed transversely arranged slotted portions to retainingly receive a longitudinally movable cable, means hingedly connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed tapered extensions depending from the lower ends of said clamps below said cable constituting complemental portions of a lug, an interiorly tapered sleeve positioned over said lug, said lug having an exterior annular seat adjacent its outer end, and a resilient locking clip nested within said slot and retainingly engageable with said sleeve.

10. A trolley for supporting a load along a flanged beam comprising a pair of upright cable clamps having opposed transversely arranged slotted portions to retainingly receive a longitudinally movable cable, means hingedly connecting upper portions of said clamps above said cable, aligned hinged elements on opposed portions of said clamps below said cable, a locking pin removably projected through said hinge elements for interconnecting said clamps in gripping relation to said cable, a pair of spaced oppositely arranged arms extending upwardly from said clamps upon opposite sides of said beam, and an inwardly positioned roller journaled upon the upper end of each of said arms and mounted upon said beam.

11. A trolley for supporting a load along a flanged beam comprising a pair of upright cable clamps having opposed transversely arranged slotted portions to retainingly receive a longitudinally movable cable, means hingedly connecting upper portions of said clamps above said cable, aligned hinged elements on opposed portions of said clamps below said cable, a locking pin removably projected through said hinge elements for interconnecting said clamps in gripping relation to said cable, a pair of spaced oppositely arranged arms extending upwardly from said clamps upon opposite sides of said beam, an inwardly positioned roller journaled upon the upper end of each of said arms and mounted upon said beam, and registering extensions depending from the lower ends of said clamps constituting complemental portions of a load supporting lug.

12. A trolley for supporting a load along a flanged beam comprising a pair of upright cable clamps having opposed transversely arranged slotted portions to retainingly receive a longitudinally movable cable, means hingedly connecting upper portions of said clamps above said cable, aligned hinge elements on opposed portions of said clamps below said cable, a locking pin removably projected through said hinge elements for interconnecting said clamps in gripping relation to said cable.

13. A trolley for supporting a load along a flanged beam comprising a pair of upright cable clamps having opposed transversely arranged slotted portions to retainingly receive a longitudinally movable cable, a formed projection from the inner surface of one of said clamps, the other clamp having a similarly shaped under-cut slot therein to cooperatively receive said projection in inter-locking relation, a pair of spaced oppositely arranged arms extending upwardly from said clamps upon opposite sides of said beam, an inwardly positioned roller journaled upon the upper end of each of said arms and mounted upon said beam, opposed tapered threaded extensions depending from the lower ends of said clamps below said cable, constituting complemental portions of a lug, and an interiorly tapered nut threaded upon said lug for interconnecting said clamps in gripping relation to said cable.

14. A trolley for supporting a load along a flanged beam comprising a pair of upright cable clamps having opposed transversely arranged slotted portions to retainingly receive a longitudinally movable cable, means connecting upper portions of said clamps above said cable, a pair of spaced oppositely arranged arms extending upwardly from said clamps upon opposite sides of said beam, an inwardly positioned roller journaled upon the upper end of each of said arms and mounted upon said beam, opposed extensions depending from the lower ends of said clamps below said cable constituting complemental portions of a lug, and sleeve-like securing means positioned around and secured to said lug for interconnecting said clamps in gripping relation to said cable.

LEO T. DAIGLE.

References Cited in the file of this patent

UNITED STATES PATENTS

| Number | Name | Date |
| --- | --- | --- |
| 435,025 | Schenck | Aug. 26, 1890 |
| 1,901,850 | Shafer | Mar. 14, 1933 |
| 2,411,906 | Suman | Dec. 3, 1946 |
| 2,556,487 | Vogt | June 12, 1951 |